(12) United States Patent
Maas et al.

(10) Patent No.: US 12,024,175 B2
(45) Date of Patent: *Jul. 2, 2024

(54) VEHICLE SYSTEM FOR DETECTION OF ONCOMING VEHICLES

(71) Applicant: Arriver Software AB, San Diego, CA (US)

(72) Inventors: Michael Maas, Munich (DE); Andreas Schmid, Dachau (DE); Christopher Unverdorben, Munich (DE)

(73) Assignee: Arriver Software AB, Vargarda (SE)

(*) Notice: Subject to any disclaimer, the term of this patent is extended or adjusted under 35 U.S.C. 154(b) by 43 days.

This patent is subject to a terminal disclaimer.

(21) Appl. No.: 17/861,632

(22) Filed: Jul. 11, 2022

(65) Prior Publication Data

US 2022/0348209 A1 Nov. 3, 2022

Related U.S. Application Data

(63) Continuation of application No. 16/620,051, filed as application No. PCT/EP2018/064762 on Jun. 5, 2018, now Pat. No. 11,433,900.

(30) Foreign Application Priority Data

Jun. 9, 2017 (EP) .................................... 17175128

(51) Int. Cl.
*B60W 40/04* (2006.01)
*G01S 13/931* (2020.01)

(52) U.S. Cl.
CPC ..... *B60W 40/04* (2013.01); *B60W 2554/4044* (2020.02); *B60W 2554/80* (2020.02);
(Continued)

(58) Field of Classification Search
CPC ... G01S 2013/9318; G01S 2013/93185; G01S 2013/9323; G01S 2013/93271; G01S 13/931; B60W 2554/4044; B60W 2554/80
(Continued)

(56) References Cited

U.S. PATENT DOCUMENTS 7,522,091 B2 * 4/2009 Cong ..................... G01C 21/26
342/107
7,885,766 B2 2/2011 Sugimoto et al.
(Continued)

FOREIGN PATENT DOCUMENTS

CN 104487309 A 4/2015
CN 106355890 A 1/2017
(Continued)

OTHER PUBLICATIONS

European Search Report—17175128—Search Authority—Munich—Dec. 7, 2017.
(Continued)

*Primary Examiner* — Atul Trivedi
(74) *Attorney, Agent, or Firm* — Arriver Software AB

(57) ABSTRACT

A vehicle environment detection system in an ego vehicle, including a sensor arrangement and a main control unit is arranged to detect and track at least one oncoming vehicle, and to determine whether the ego vehicle has entered a curve. The main control unit is arranged to determine a common curve with a radius, along which common curve the ego vehicle is assumed to travel, determine a measured oncome direction of the oncoming vehicle on the common curve, corresponding to an oncome angle, determine a difference angle between the measured oncome direction and an oncome direction corresponding to if the oncoming vehicle would be moving along the common curve, compare
(Continued)

the difference angle with a threshold angle, and to determine that the oncoming vehicle is crossing if the difference angle exceeds the threshold angle.

12 Claims, 4 Drawing Sheets

(52) U.S. Cl.
CPC ...... *B60W 2554/805* (2020.02); *G01S 13/931* (2013.01); *G01S 2013/9318* (2020.01); *G01S 2013/93185* (2020.01); *G01S 2013/9323* (2020.01); *G01S 2013/93271* (2020.01)

(58) Field of Classification Search
USPC .......................................................... 701/300
See application file for complete search history.

(56) References Cited

U.S. PATENT DOCUMENTS

| | | | |
|---|---|---|---|
| 8,847,792 B2 | 9/2014 | Tsunekawa | |
| 9,436,880 B2 | 9/2016 | Bos et al. | |
| 9,896,094 B2 | 2/2018 | Nishimura et al. | |
| 2005/0209764 A1 | 9/2005 | Schroder | |
| 2006/0111842 A1 | 5/2006 | Sugimoto et al. | |
| 2011/0175767 A1 | 7/2011 | Tsunekawa | |
| 2013/0169449 A1 | 7/2013 | Tsunekawa | |
| 2014/0288816 A1* | 9/2014 | Hayasaka | B60W 30/0953 701/301 |
| 2015/0003087 A1* | 1/2015 | Futamura | B60Q 9/008 362/466 |
| 2015/0016678 A1* | 1/2015 | Imaeda | G06V 20/584 382/103 |
| 2015/0042225 A1* | 2/2015 | Fukayama | B60Q 1/143 315/82 |
| 2015/0077826 A1* | 3/2015 | Beckman | H04N 23/687 359/601 |
| 2015/0166062 A1 | 6/2015 | Johnson et al. | |
| 2015/0298692 A1* | 10/2015 | Minemura | B60W 30/09 701/1 |
| 2015/0332103 A1* | 11/2015 | Yokota | G06F 16/5854 348/149 |
| 2015/0334269 A1* | 11/2015 | Yokota | G06T 11/60 382/103 |
| 2016/0046290 A1* | 2/2016 | Aharony | B60W 10/20 701/41 |
| 2016/0103218 A1* | 4/2016 | Mandava | B60Q 5/006 701/301 |
| 2016/0137177 A1* | 5/2016 | Wilhelm | B60T 7/22 701/70 |
| 2016/0137195 A1 | 5/2016 | Takahashi et al. | |
| 2016/0148511 A1* | 5/2016 | Shibata | G08G 1/166 701/119 |
| 2016/0167566 A1* | 6/2016 | Tanaka | F21S 41/663 315/82 |
| 2016/0207534 A1* | 7/2016 | Nishimura | B60W 30/18145 |
| 2016/0247393 A1* | 8/2016 | Okamoto | B60W 50/14 |
| 2016/0272197 A1 | 9/2016 | Hulten et al. | |
| 2016/0304028 A1* | 10/2016 | Hathaway | G01S 13/931 |
| 2016/0325753 A1 | 11/2016 | Stein et al. | |
| 2016/0368505 A1* | 12/2016 | Sorstedt | B60W 40/072 |
| 2017/0015312 A1* | 1/2017 | Latotzki | B62D 15/027 |
| 2017/0039865 A1 | 2/2017 | Takabayashi et al. | |
| 2017/0113665 A1* | 4/2017 | Mudalige | G08G 1/163 |
| 2017/0113683 A1* | 4/2017 | Mudalige | B60W 30/0956 |
| 2018/0252808 A1* | 9/2018 | Helvajian | G01S 13/931 |
| 2020/0086919 A1 | 3/2020 | Riikonen et al. | |
| 2020/0132833 A1 | 4/2020 | Maas et al. | |
| 2020/0198640 A1 | 6/2020 | Maas et al. | |
| 2021/0171061 A1 | 6/2021 | Etesami | |
| 2021/0271249 A1 | 9/2021 | Kobashi et al. | |
| 2022/0073095 A1* | 3/2022 | Seitz | B60K 35/00 |
| 2022/0135063 A1* | 5/2022 | Seitz | B60K 35/22 701/23 |
| 2022/0283587 A1* | 9/2022 | Kabzan | B60W 40/105 |
| 2022/0317286 A1* | 10/2022 | Cass | G01S 7/42 |
| 2022/0348209 A1* | 11/2022 | Maas | B60W 30/0953 |

FOREIGN PATENT DOCUMENTS

| | | | | |
|---|---|---|---|---|
| DE | 102019215147 A1 | | 4/2021 | |
| EP | 0899543 A2 | | 3/1999 | |
| EP | 1065520 A2 | | 1/2001 | |
| EP | 3176541 A1 | * | 6/2017 | ............ B60Q 9/008 |
| JP | 2006267005 A | | 10/2006 | |
| JP | 2010013012 A | | 1/2010 | |
| WO | WO-2016092591 A1 | * | 6/2016 | ............ B60W 30/09 |
| WO | WO-2016189112 A1 | * | 12/2016 | .......... B60W 30/095 |
| WO | WO-2017085991 A1 | * | 5/2017 | ............ B60W 30/09 |
| WO | 2018224495 A1 | | 12/2018 | |
| WO | 2018224500 A1 | | 12/2018 | |
| WO | WO-2022175034 A1 | * | 8/2022 | ............ B60W 30/08 |
| WO | WO-2022175103 A1 | * | 8/2022 | |

OTHER PUBLICATIONS

International Search Report and Written Opinion—PCT/EP2018/064762—ISA/EPO—Jul. 2, 2018.

* cited by examiner

VEHICLE SYSTEM FOR DETECTION OF ONCOMING VEHICLES

CROSS-REFERENCE TO RELATED APPLICATIONS

This application is a continuation of U.S. application Ser. No. 16/620,051, filed Dec. 6, 2019, entitled "A VEHICLE SYSTEM FOR DETECTION OF ONCOMING VEHICLES," which is a 35 U.S.C. § 371 national phase of PCT International Application No. PCT/EP2018/064762, filed Jun. 5, 2018, entitled "A VEHICLE SYSTEM FOR DETECTION OF ONCOMING VEHICLES," which claims the benefit of priority under 35 U.S.C. § 119 to European Patent Application No. 17175128.2, filed Jun. 9, 2017, entitled "A VEHICLE SYSTEM FOR DETECTION OF ONCOMING VEHICLES," the content of each of which is incorporated herein by reference in its entirety for all purposes.

FIELD OF THE INVENTION

The present disclosure relates to a vehicle environment detection system adapted to be mounted in an ego vehicle and including at least one vehicle environment sensor arrangement and a main control unit. The vehicle environment detection system is arranged to detect and track at least one oncoming vehicle.

BACKGROUND

Today, vehicle environment detection systems, such as for example camera systems. Doppler radar systems and Lidar (Light Detection and Ranging) systems, can be mounted on a vehicle in order to detect objects in order to implement automated vehicle systems such as speed control and collision prevention.

Radar systems are arranged to produce output including a series of reflection points as measured by radar sensors. These reflection points can be treated as separate detections or grouped as tracked objects, providing a common motion state for an extended object.

There are previously known vehicle occupant safety systems which detect side-impacts before the actual crash. In the case that it has been determined that a crash is imminent, vehicle occupants can for example be pushed towards the middle of the car.

To avoid false positives, a sensor used for this purpose has to robustly classify tracks as oncoming or crossing traffic, especially in curves.

U.S. Pat. No. 8,847,792 discloses estimating the risk of an impact of an oncoming vehicle based on the movement amount of a radar reflection point on the oncoming vehicle when the reflection point varies in a vehicle width direction from the left front end toward the right front end of an oncoming vehicle. The acquired data is used for determination of the possibility of collision with an oncoming vehicle, on a curved road or the like.

It is, however, desired to provide a vehicle radar system that is adapted to classify tracks as oncoming or crossing traffic, especially in curves in an accurate, efficient and reliable manner, which also is an object of the present disclosure. In the case of oncoming traffic, it is determined whether an oncoming vehicle will collide with an ego vehicle.

SUMMARY

The above expressed object is achieved by a vehicle environment detection system adapted to be mounted in an ego vehicle and including at least one vehicle environment sensor arrangement and a main control unit. The vehicle environment detection system is arranged to detect and track at least one oncoming vehicle, and to determine whether the ego vehicle has entered a curve. When the vehicle environment detection system has determined that the ego vehicle has entered a curve, for each tracked oncoming vehicle, the main control unit is arranged to perform the following steps:

Determine a common curve with a radius along which common curve the ego vehicle is assumed to travel.

Determine a measured oncome direction of the tracked oncoming vehicle on the common curve, corresponding to an oncome angle with respect to a predetermined axis.

Determine a difference angle between the measured oncome direction and an oncome direction corresponding to if the oncoming vehicle would be moving along the common curve.

Compare the difference angle with a threshold angle.

Determine that the oncoming vehicle is crossing if the difference angle has been determined to exceed the threshold angle.

The object is also achieved by a method for detecting oncoming vehicles relative an ego vehicle. The method includes the further step of:

Detecting and tracking at least one oncoming vehicle and determining whether the ego vehicle has entered a curve.

When it has been determined that the ego vehicle has entered a curve, for each tracked oncoming vehicle, the method further includes the step of determining a common curve with a radius, along which common curve the ego vehicle is assumed to travel, and determining a measured oncome direction of the tracked oncoming vehicle on the common curve, corresponding to an oncome angle with respect to a predetermined axis.

The method then includes the steps of determining a difference angle between the measured oncome direction and an oncome direction corresponding to if the oncoming vehicle would be moving along the common curve, comparing the difference angle with a threshold angle, and finally determining that the oncoming vehicle is crossing if the difference angle has been determined to exceed the threshold angle.

A number of advantages are obtained by the present disclosure. Mainly, a vehicle radar system is provided that determines whether an oncoming vehicle will collide with an ego vehicle in an accurate, efficient and reliable manner.

According to some aspects, for each tracked oncoming vehicle that has been determined to be crossing, one or more safety measures is/are applied.

According to some aspects, the main control unit is arranged to calculate the difference angle according to $\delta\theta_{track}-\alpha$, where $\theta_{track}$ is the oncome angle and $\alpha$ is a calculated oncome angle corresponding to if the oncoming vehicle would be moving along the common curve. The main control unit is arranged to calculate the calculated oncome angle according to:

$$\alpha = 2 \cdot \arcsin\left[\frac{D \cdot \gamma_{ego}}{2 \cdot v}\right]$$

where D is a position between a reference point with respect to the ego vehicle and detected oncoming position, which both are adjusted to be positioned on the common curve. $\gamma_{ego}$ is an angular rotational velocity around the reference point, and v is an ego vehicle velocity.

According to some aspects, when the vehicle environment detection system has determined that the ego vehicle has entered a curve, the main control unit is arranged to increase the threshold angle stepwise from a first threshold angle to a second threshold angle. This is performed in a in a step-wise manner according to:

$$\theta_{max}(i) = \theta_{max}(i-1) + \left(\frac{2 \cdot t_{cyc}}{\dot{\gamma}_{ego}}\right),$$

where $t_{cyc}$ is the time for each measurement cycle (in a preferred embodiment—a radar cycle), i is an increasing step index indicating that the current value always is calculated based on the value of the last cycle, and $\dot{\gamma}_{ego}$ is an angular rotational velocity for the ego vehicle. The second threshold angle exceeds the first threshold angle.

In this manner, the reliability of the vehicle environment detection system is increased.

According to some aspects, when the vehicle environment detection system has determined that the ego vehicle has left the curve, the threshold angle is step-wise reduced to the first threshold angle.

Other aspects of the present disclosure are disclosed in this disclosure.

BRIEF DESCRIPTION OF THE DRAWINGS

The present disclosure will now be described more in detail with reference to the appended drawings, where.

DETAILED DESCRIPTION

Figure 1:
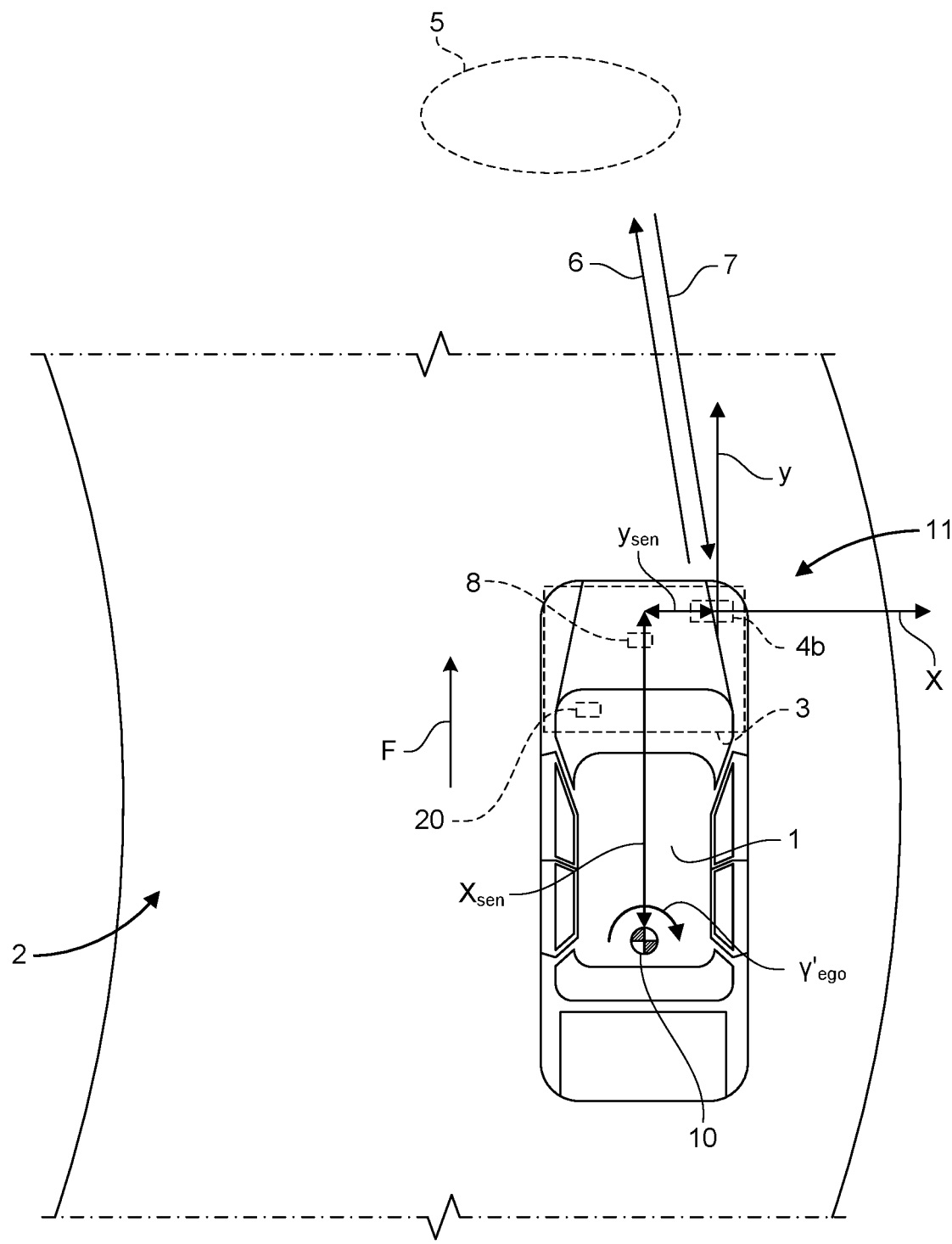
FIG. 1 shows a schematic top view of an ego vehicle.

FIG. 1 schematically shows a top view of an ego vehicle 1 arranged to run at an ego vehicle velocity v on a road 2 in a forward over-ground movement direction F, in the following referred to as ego direction F, where the ego vehicle 1 includes a vehicle radar system 3. The vehicle radar system 3 includes a radar sensor arrangement 4 that is arranged to distinguish and/or resolve single targets from the surroundings by transmitting signals 6 and receiving reflected signals 7 and using a Doppler effect in a previously well-known manner. The vehicle radar system 3 further includes a main control unit 8 that is connected to the radar sensor arrangement 4 and is arranged to provide radial velocity and azimuth angles of possible target objects 5 by simultaneously sampling and analyzing phase and amplitude of the received signals 7.

The reflected signals 7 correspond to radar detections, where the main control unit 8 includes a tracking function that is arranged to group these radar detections as tracked objects, providing a common motion state for an extended detected object.

The ego vehicle 1 has a center of mass 10 and an angular rotational velocity $\dot{\gamma}_{ego}$ around the center of mass 10, and the radar sensor arrangements 4 has a certain relation to the center of mass 10. In order to detect an ego direction angle $\gamma_{ego}$, that corresponds to the ego direction F, and the corresponding rotational velocity $\dot{\gamma}_{ego}$ a yaw sensor device 20 is connected to the main control unit 8.

The radar sensor arrangement is positioned in the origin of a corresponding coordinate system 11, and is positioned at a distance $y_{sen}$ along a y-axis of the coordinate system 11 from the center of mass 10, and at a distance $x_{sen}$ along an x-axis of the coordinate system 11 from the center of mass 10.

Figure 2:
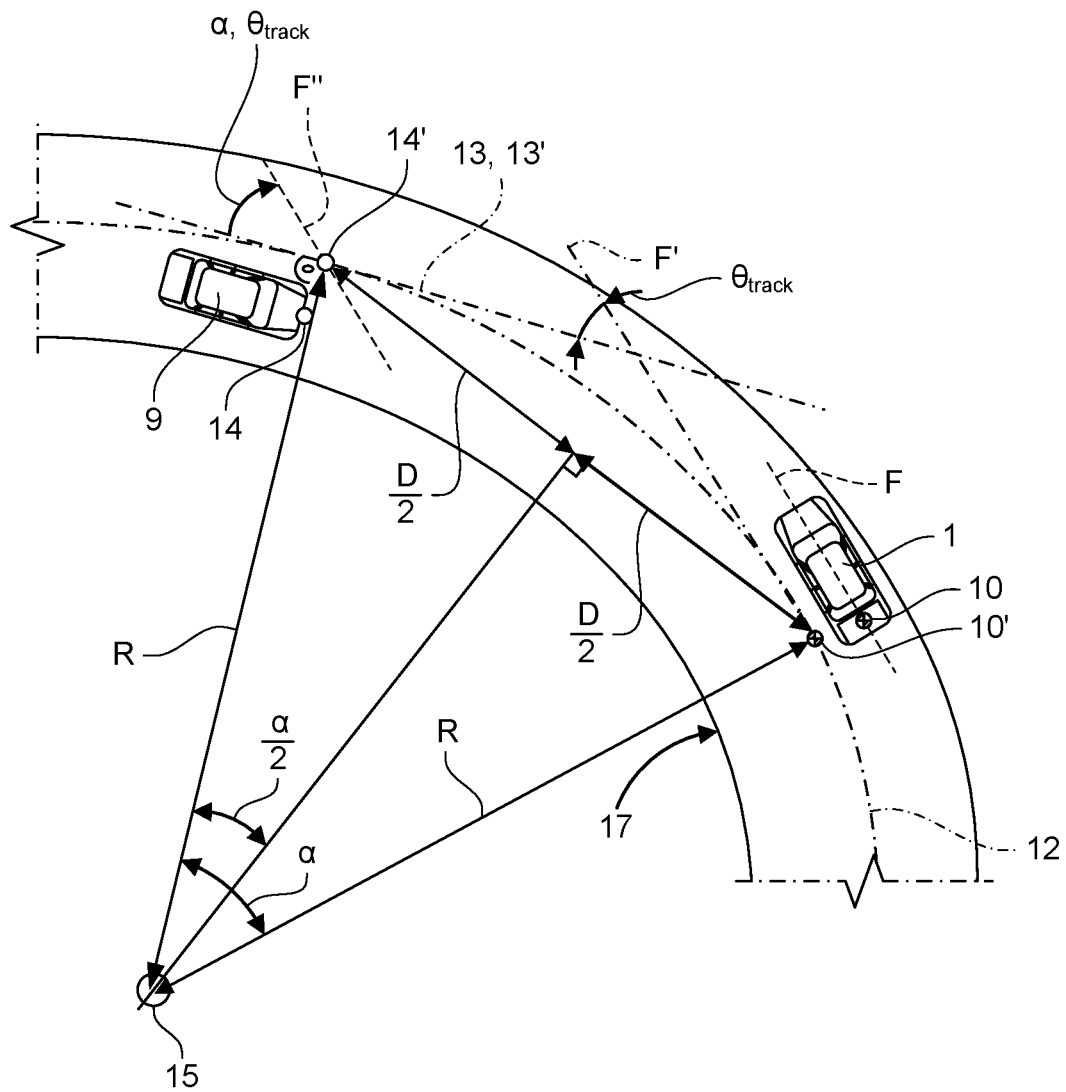
FIG. 2 shows a schematic top view of an ego vehicle and an oncoming vehicle according to a first example.

With reference also to FIG. 2, the ego vehicle 1 runs in the ego direction F on the road 2, and the vehicle radar system 3 tracks a detected object in the form of an oncoming vehicle 9. The tracking function is arranged to determine overground speed of the oncoming vehicle 9 in the form of perpendicular velocity components $v_{xtrack}$, $v_{ytrack}$ as:

$$\begin{bmatrix} v_{xtrack} \\ v_{ytrack} \end{bmatrix} = \begin{bmatrix} v_{relX} \\ v_{relY} \end{bmatrix} + \begin{bmatrix} v_{egoX} \\ 0 \end{bmatrix} + \begin{bmatrix} -y_{sen} \cdot \dot{\gamma}_{ego} \\ x_{sen} \cdot \dot{\gamma}_{ego} \end{bmatrix} \quad (1)$$

where $v_{relx}$, $v_{rely}$ is the detected relative velocity of the oncoming vehicle 9, $v_{egoX}$ is the movement of the radar sensor arrangement 4 resulting from the center of mass 10 of the ego vehicle 1, $y_{sen} \cdot \dot{\gamma}_{ego}$, $x_{sen} \cdot \dot{\gamma}_{ego}$ is the movement of the radar sensor arrangement 4 resulting from a rotational movement around the center of mass 10.

The oncoming vehicle 9 has a detected oncoming position 14 and a measured oncome direction 13 according to an oncome angle $\theta_{track}$ with respect to the x-axis, which oncome angle $\theta_{track}$ is calculated as:

$$\theta_{track} = a\tan\frac{v_{xtrack}}{v_{xtrack}}. \quad (2).$$

In FIG. 2, the measured oncome direction 13 and the ego direction F are shifted to correspond with that the vehicles 1, 9 are positioned on a common curve 12 with a certain curve radius R. The center of mass 10 of the ego vehicle 1 is shifted to an adjusted center of mass 10' and the oncoming vehicle 9 is shifted to an adjusted detected oncoming position 14' which both are positioned on the common curve 12. This does not affect the oncome angle $\theta_{track}$.

According to the present disclosure, the main control unit 8 is arranged to determine whether the ego vehicle 1 travels in a curve 17 by detecting if the angular rotational velocity $\dot{\gamma}_{ego}$ exceeds a certain threshold, according to some aspects 2 deg/s. If that is the case, the main control unit 8 is arranged to determine a calculated oncome direction 13' that the oncoming vehicle 9 would have if it is moving along the common curve 12. The calculated oncome direction 13' corresponds to a direction the ego vehicle 1 would follow when it had travelled to the position of the oncoming vehicle 9 along the common curve 12. The calculated oncome direction 13' has a certain calculated oncome angle α relative the ego direction F" in the position of the oncoming vehicle 9, and the calculated oncome angle α is thus the angle that the ego direction F would be shifted when the ego vehicle 1 has travelled to the position of the oncoming vehicle 9 along the common curve 12.

The main control unit 8 is then arranged to calculate a difference angle δ between the measured oncome direction 13 and the calculated oncome direction 13' such that it can be established how much the oncome direction 13 differ from the calculated oncome direction 13' that corresponds to if the oncoming vehicle is moving on the same common curve 12 as the ego vehicle 1. The difference angle δ thus constitutes a difference between the oncome angle $\theta_{track}$ and the calculated oncome angle $\alpha$. If the difference angle $\delta$ exceeds a certain threshold angle $\theta_{max}$, the oncoming vehicle 9 is determined to be crossing.

Figure 3:
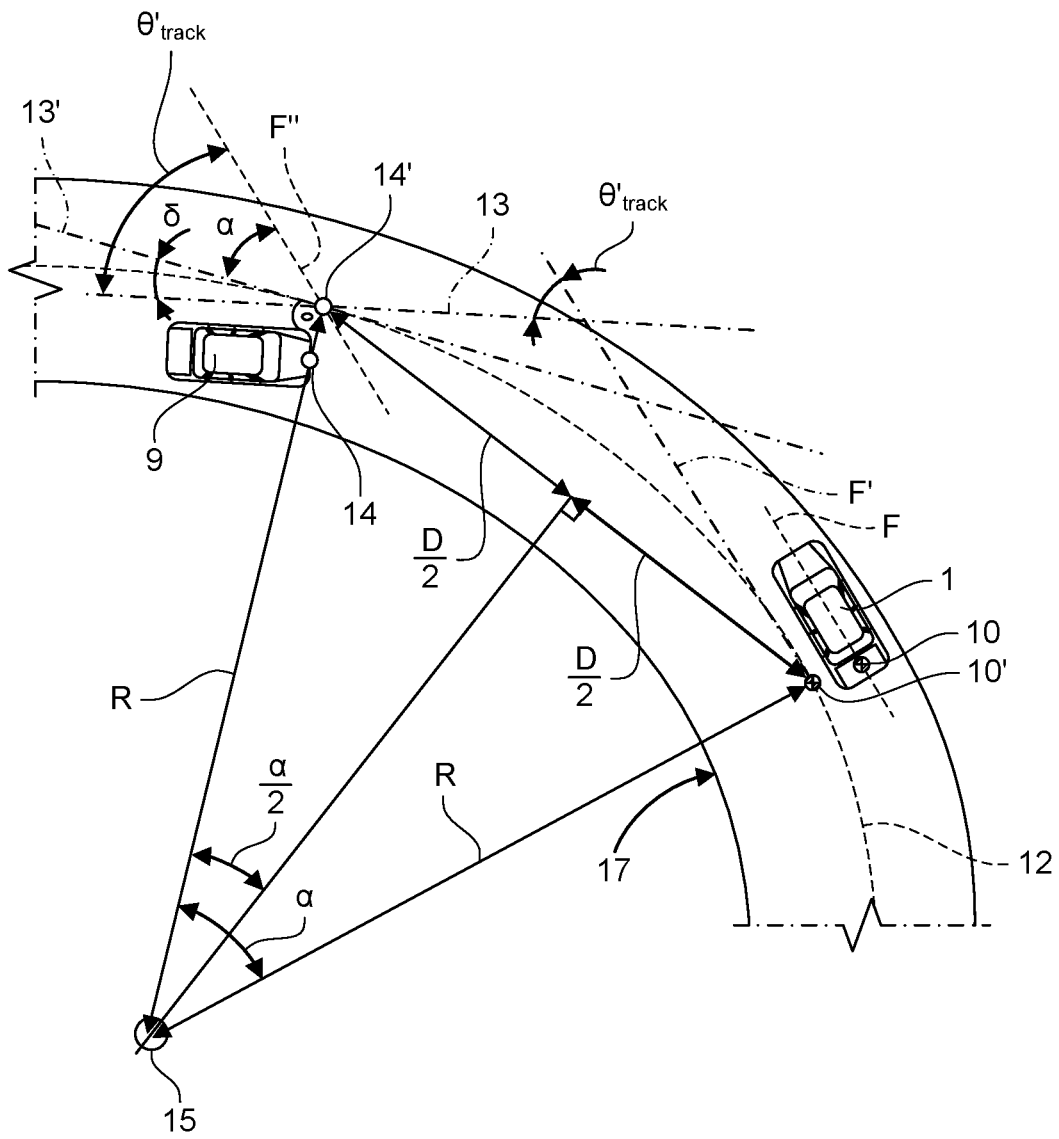
FIG. 3 shows a schematic top view of an ego vehicle and an oncoming vehicle according to a second example.

With reference to FIG. 2 and FIG. 3, showing a first example and a second example, respectively, it will now be explained how the calculated oncome direction 13' and the calculated oncome angle $\alpha$ are determined.

For the calculated oncome direction 13' it is assumed that both vehicles 1, 9 move along the common curve 12. In order to obtain the calculated oncome angle $\alpha$, a triangle between a common curve middle-point 15, the adjusted detected oncoming position 14', and the adjusted center of mass 10' is formed. This triangle is divided into two isosceles 90°-triangles. A distance D between the detected oncoming position 14 and the adjusted center of mass 10 is known and assumed to be the same as a distance between the adjusted detected oncoming position 14' and the adjusted center of mass 10'; a short side of one 90°-triangle is then D/2.

The common curve radius R is calculated by using the ego vehicle velocity v and the angular rotational velocity $\gamma_{ego}$ according to:

$$R = \frac{v}{\gamma_{ego}},\qquad(3)$$

where trigonometry together with equation (3) yields:

$$\sin\frac{\alpha}{2} = \frac{\frac{D}{2}}{R} = \frac{\frac{D}{2}}{\frac{v}{\gamma_{ego}}}.\qquad(4)$$

As a result, $$\alpha = 2 \cdot \arcsin\left[\frac{D \cdot \gamma_{ego}}{2 \cdot v}\right].\qquad(5)$$

In FIG. 2, the oncome angle $\theta_{track}$ equals the calculated oncome angle $\alpha$, such that the difference angle $\delta$ equals zero. In this example, both vehicles 1, 9 move in the common curve 12.

In FIG. 3, the oncome angle $\theta'_{track}$ does not equal the calculated oncome angle $\alpha$ such that there is a certain difference angle $\delta = \theta'_{track} - \alpha$.

It is thus determined how much the actual measured moving direction of the oncoming vehicle 9 differs from the moving direction corresponding to if the oncoming vehicle 9 would be moving along the common curve 12.

In order to determine whether the oncoming vehicle 9 should be determined to be crossing or not, i.e. whether the difference angle $\delta$ exceeds a threshold or not. If the oncoming vehicle 9 is determined to be crossing, suitable safety measure are taken; for example emergency braking, emergency steering and pushing vehicle occupants towards the middle of the ego vehicle 1, suitably by provision of one or more airbags.

According to some aspects, the threshold angle $\theta_{max}$ is adaptive, such that in straight driving situations, a first threshold angle $\theta_{max1}$ is used, and in curves a second threshold angle $\theta_{max2}$ is used, where the second threshold angle $\theta_{max2}$ exceeds the first threshold angle $\theta_{max1}$. According to some aspects, the first threshold angle $\theta_{max1}$ is about 35°, and the second threshold angle $\theta_{max2}$ is about 45°.

For this purpose the main control unit 8 is arranged to determine whether the ego vehicle 1 travels in a curve or not by detecting if the angular rotational velocity $\gamma_{ego}$ exceeds a certain threshold $\gamma_{egomax}$, according to some aspects 2 deg/s, as mentioned previously. According to some aspects, If $\gamma_{ego} \geq \gamma_{egomax}$, the main control unit 8 is arranged to increase the threshold angle $\theta_{max}$ stepwise from the first threshold angle $\theta_{max1}$ to the second threshold angle $\theta_{max2}$ in a stepwise manner according to:

$$\theta_{max}(i) = \theta_{max}(i-1) + \left(\frac{2 \cdot t_{cyc}}{\gamma_{ego}}\right),\qquad(6)$$

where $t_{cyc}$ is the time for each radar cycle, where i is an increasing step index indicating that the current value always is calculated based on the value of the last cycle.

When the main control unit 8 determines that $\gamma_{ego} < \gamma_{egomax}$, the threshold angle $\theta_{max}$ is step-wise reduced to the first threshold angle $\theta_{max1}$.

Each subsequent step-wise change is according to some aspects performed for each subsequent radar cycle.

In this context, a radar cycle is one observation phase during which the vehicle radar system 3 is arranged to acquire data, process the data on several signal processing levels and to send out available results. This can be a fixed time interval, or it can be a dynamic time interval depending on environment conditions and processing load.

Figure 4:
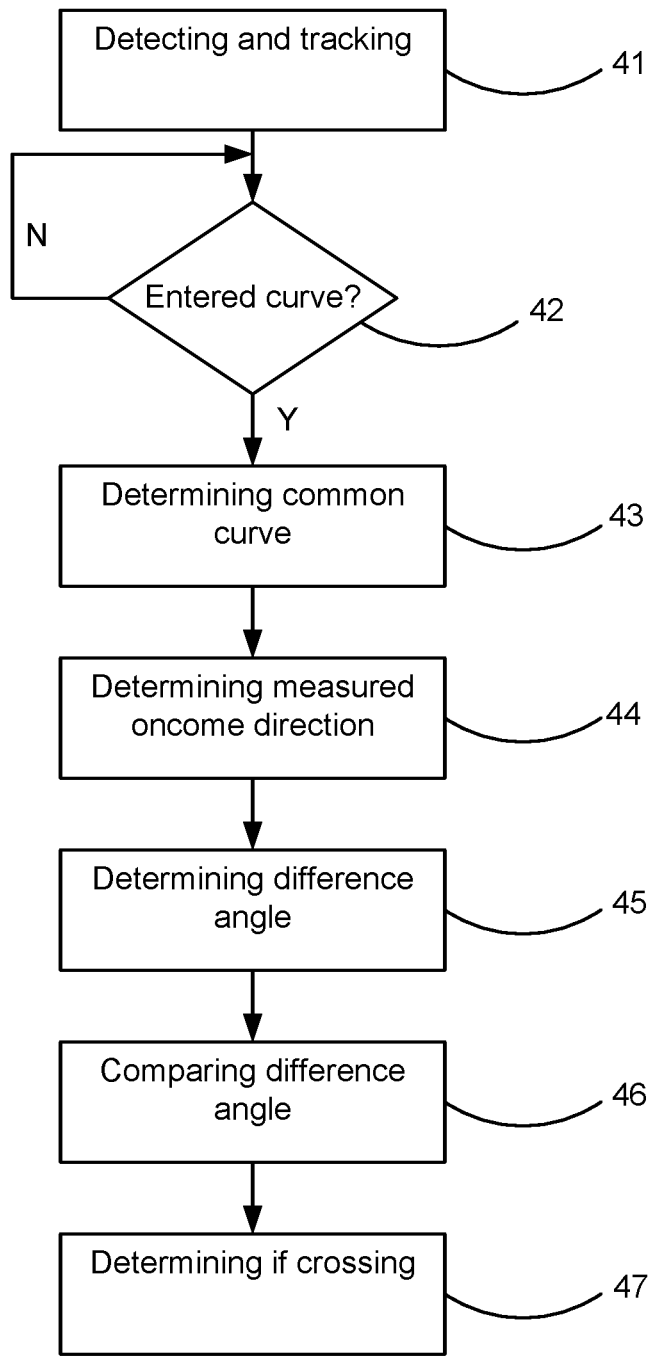
FIG. 4 shows a flowchart for a method according to the present disclosure.

With reference to FIG. 4, the present disclosure also relates to a method for detecting oncoming vehicles relative an ego vehicle 1, where the method includes:

Step 41: Detecting and tracking at least one oncoming vehicle 9.

Step 42: Determining whether the ego vehicle 1 has entered a curve 17.

When it has been determined that the ego vehicle 1 has entered a curve 17, for each tracked oncoming vehicle 9, the method further includes the steps of:

Step 43: Determining a common curve 12 with a radius R, along which common curve 12 the ego vehicle 1 is assumed to travel.

Step 44: Determining a measured oncome direction 13, 13' of the tracked oncoming vehicle 9 on the common curve 16, corresponding to an oncome angle $\theta_{track}$ with respect to a predetermined axis x.

Step 45: Determining a difference angle $\delta$ between the measured oncome direction 13, 13' and an oncome direction 13 corresponding to if the oncoming vehicle 9 would be moving along the common curve 12.

Step 46: Comparing the difference angle $\delta$ with a threshold angle $\theta_{max}$.

Step 47: Determining that the oncoming vehicle 9 is crossing if the difference angle $\delta$ has been determined to exceed the threshold angle $\theta_{max}$.

According to some aspects, for each tracked oncoming vehicle 9 that has been determined to be crossing, the method includes applying one or more safety measures.

The present disclosure is not limited to the examples above, but may vary freely within the scope of the appended claims. For example, the vehicle radar system 3 is provided in a vehicle environment detection system 40. Generally, the present disclosure is related to a vehicle environment detection system 40 arranged for any suitable environment detection technology, for example radar as in the examples above, but also Lidar (Light detection and ranging) and/or image detection are conceivable. According to some aspects, when a yaw sensor device is present, the yaw sensor device 20 is part of the vehicle environment detection system 40.

The vehicle environment detection system 40 generally includes one or more environment detection sensor arrangements 4.

The main control unit 8 includes one or more control unit parts which according to some aspects are combined, adjacent or distributed. One or more of such control unit parts are according to some aspects included as part of the vehicle environment detection system 40.

Instead of center of mass, any suitable reference point on the ego vehicle 1 can be used and adjusted to lie on the common curve 12.

The orientation of the coordinates and the coordinate system may have many suitable configurations, generally there is a predetermined axis with reference to which the ego direction F is determined.

Generally, the present disclosure relates to a vehicle environment detection system 40 adapted to be mounted in an ego vehicle 1 and including at least one vehicle environment sensor arrangement 4 and a main control unit 8, where the vehicle environment detection system 40 is arranged to detect and track at least one oncoming vehicle 9, where the vehicle environment detection system 40 is arranged to determine whether the ego vehicle 1 has entered a curve 17. When the vehicle environment detection system 40 has determined that the ego vehicle 1 has entered a curve 17, for each tracked oncoming vehicle 9, the main control unit 8 is arranged to:

determine a common curve 12 with a radius R, along which common curve 12 the ego vehicle 1 is assumed to travel;

determine a measured oncome direction 13, 13' of the tracked oncoming vehicle 9 on the common curve 16, corresponding to an oncome angle $\theta_{track}$ with respect to a predetermined axis x;

determine a difference angle δ between the measured oncome direction 13, 13' and an oncome direction 13 corresponding to if the oncoming vehicle 9 would be moving along the common curve 12;

compare the difference angle δ with a threshold angle $\theta_{max}$; and determine that the oncoming vehicle 9 is crossing if the difference angle δ has been determined to exceed the threshold angle $\theta_{max}$.

According to some aspects, for each tracked oncoming vehicle 9 that has been determined to be crossing, the main control unit 8 is arranged to apply one or more safety measures.

According to some aspects, the vehicle environment detection system 40 includes a yaw sensor device 20 that is connected to the main control unit 8 and is arranged to enable the main control unit 8 to determine an ego direction F along which the ego vehicle 1 travels and to determine whether the ego vehicle 1 has entered a curve 17.

According to some aspects, the main control unit 8 is arranged to calculate the difference angle δ according to $\delta = \theta_{track} - \alpha$, where $\theta_{track}$ is the oncome angle and α is a calculated oncome angle corresponding to if the oncoming vehicle 9 would be moving along the common curve 12, where the main control unit 8 is arranged to calculate the calculated oncome angle α according to:

$$\alpha = 2 \cdot \arcsin\left[\frac{D \cdot \dot{\gamma}_{ego}}{2 \cdot v}\right]$$

where D is a position between a reference point 10' with respect to the ego vehicle and detected oncoming position 14' which both are adjusted to be positioned on the common curve 12, $\dot{\gamma}_{ego}$ is an angular rotational velocity $\dot{\gamma}_{ego}$ around the reference point 10', and v is an ego vehicle velocity.

According to some aspects, the reference point 10' is an adjusted center of mass 10 of the ego vehicle 1, and that the angular rotational velocity $\dot{\gamma}_{ego}$ is defined around the center of mass 10.

According to some aspects, when the vehicle environment detection system 40 has determined that the ego vehicle 1 has entered a curve 17, the main control unit 8 is arranged to increase the threshold angle $\theta_{max}$ stepwise from a first threshold angle $\theta_{max1}$ to a second threshold angle $\theta_{max2}$ in a step-wise manner according to:

$$\theta_{max}(i) = \theta_{max}(i-1) + \left(\frac{2 \cdot t_{cyc}}{\dot{\gamma}_{ego}}\right),$$

where $t_{cyc}$ is the time for each radar cycle, i is an increasing step index indicating that the current value always is calculated based on the value of the last cycle, $\dot{\gamma}_{ego}$ is an angular rotational velocity for the ego vehicle 1, and where the second threshold angle $\theta_{max2}$ exceeds the first threshold angle $\theta_{max1}$.

According to some aspects, when the vehicle environment detection system 40 has determined that the ego vehicle 1 has left the curve 17, the threshold angle $\theta_{max}$ is step-wise reduced to the first threshold angle $\theta_{max1}$.

According to some aspects, the vehicle environment detection system 40 includes at least one of a radar system 3, a Lidar (Light Detection and Ranging) system and/or an image detection system.

Generally, the present disclosure also relates to a method for detecting oncoming vehicles relative an ego vehicle 1, where the method includes the steps of:

Step 41: detecting and tracking at least one oncoming vehicle 9; and

Step 42: determining whether the ego vehicle 1 has entered a curve 17.

When it has been determined that the ego vehicle 1 has entered a curve 17, for each tracked oncoming vehicle 9, the method further includes the steps of:

Step 43: determining a common curve 12 with a radius R along which common curve 12 the ego vehicle 1 is assumed to travel;

Step 44: determining a measured oncome direction 13, 13' of the tracked oncoming vehicle 9 on the common curve 16, corresponding to an oncome angle $\theta_{track}$ with respect to a predetermined axis x;

Step 45: determining a difference angle δ between the measured oncome direction 13, 13' and an oncome direction 13 corresponding to if the oncoming vehicle 9 would be moving along the common curve 12;

Step 46: comparing the difference angle δ with a threshold angle $\theta_{max}$; and Step 47: determining that the oncoming vehicle 9 is crossing if the difference angle δ has been determined to exceed the threshold angle $\theta_{max}$.

According to some aspects, for each tracked oncoming vehicle 9 that has been determined to be crossing, the method includes applying one or more safety measures.

According to some aspects, the method includes:

calculating the difference angle δ according to $\delta = \theta_{track} - \alpha$, where $\theta_{track}$ is the oncome angle and $\alpha$ is a calculated oncome angle corresponding to if the oncoming vehicle 9 would be moving along the common curve 12; and calculating the calculated oncome angle $\alpha$ according to:

$$\alpha = 2 \cdot \arcsin\left[\frac{D \cdot \gamma_{ego}}{2 \cdot v}\right]$$

where D is a position between a reference point 10' with respect to the ego vehicle and detected oncoming position 14' which both are adjusted to be positioned on the common curve 12, $\dot{\gamma}_{ego}$ is an angular rotational velocity $\dot{\gamma}_{ego}$ around the reference point 10', and v is an ego vehicle velocity.

According to some aspects, the reference point 10' is an adjusted center of mass 10 of the ego vehicle 1, and that the angular rotational velocity $\dot{\gamma}_{ego}$ is defined around the center of mass 10.

According to some aspects, when it has been determined that the ego vehicle 1 has entered a curve 17, the method includes increasing the threshold angle $\theta_{max}$ stepwise from a first threshold angle $\theta_{max1}$ to a second threshold angle $\theta_{max2}$ in a step-wise manner according to:

$$\theta_{max}(i) = \theta_{max}(i-1) + \left(\frac{2 \cdot t_{cyc}}{\dot{\gamma}_{ego}}\right),$$

where $t_{cyc}$ is the time for each radar cycle, i is an increasing step index indicating that the current value always is calculated based on the value of the last cycle, $\dot{\gamma}_{ego}$ is an angular rotational velocity for the ego vehicle 1, and where the second threshold angle $\theta_{max2}$ exceeds the first threshold angle $\theta_{max1}$.

According to some aspects, when it has been determined that the ego vehicle 1 has left the curve 17, the method includes step-wise reducing the threshold angle $\theta_{max}$ to the first threshold angle $\theta_{max1}$.

While the above description constitutes the preferred embodiment of the present invention, it will be appreciated that the invention is susceptible to modification, variation and change without departing from the proper scope and fair meaning of the accompanying claims.

The invention claimed is:

1. An oncoming vehicle detection system adapted to be mounted to an ego vehicle, the oncoming vehicle detection system being configured to:
   determine that an oncoming vehicle and the ego vehicle are concurrently present on a curved portion of a road; and
   determine, in response thereto:
      a calculated oncome direction of the oncoming vehicle relative to the curved portion of the road;
      a measured oncome direction of the oncoming vehicle based on at least one measurement of the oncoming vehicle by a vehicle environment sensor of the oncoming vehicle detection system; and
      whether a difference between the calculated oncome direction and the measured oncome direction is indicative of the oncoming vehicle being crossing traffic.

2. The oncoming vehicle detection system of claim 1, wherein to determine whether the difference between the calculated oncome direction and the measured oncome direction is indicative of the oncoming vehicle being crossing traffic, the oncoming vehicle detection system is configured to determine whether a difference between the calculated oncome direction and the measured oncome direction exceeds a threshold.

3. The oncoming vehicle detection system of claim 2, wherein the oncoming vehicle detection system is configured to increase the threshold over time.

4. The oncoming vehicle detection system of claim 1, wherein the calculated oncome direction is a tangent to the curved portion of the road at a location of the curved portion of the road corresponding to the oncoming vehicle.

5. An oncoming vehicle detection method comprising:
   determining that an oncoming vehicle and an ego vehicle are concurrently present on a curved portion of a road; and
   determining, in response thereto:
      a calculated oncome direction of the oncoming vehicle relative to the curved portion of the road;
      a measured oncome direction of the oncoming vehicle based on at least one measurement of the oncoming vehicle by a vehicle environment sensor of the oncoming vehicle detection system; and
      whether a difference between the calculated oncome direction and the measured oncome direction is indicative of the oncoming vehicle being crossing traffic.

6. The oncoming vehicle detection method of claim 5, wherein determining whether the difference between the calculated oncome direction and the measured oncome direction is indicative of the oncoming vehicle being crossing traffic comprises determining whether a difference between the calculated oncome direction and the measured oncome direction exceeds a threshold.

7. The oncoming vehicle detection method of claim 6, further comprising increasing the threshold over time.

8. The oncoming vehicle detection system of claim 6, wherein the means for determining whether the difference between the calculated oncome direction and the measured oncome direction exceeds the threshold comprise means for increasing the threshold over time.

9. The oncoming vehicle detection method of claim 5, wherein the calculated oncome direction is a tangent to the curved portion of the road at a location of the curved portion of the road corresponding to the oncoming vehicle.

10. The oncoming vehicle detection system of claim 5, wherein the means for determining whether the difference between the calculated oncome direction and the measured oncome direction is indicative of the oncoming vehicle being crossing traffic comprise means for determining whether a difference between the calculated oncome direction and the measured oncome direction exceeds a threshold.

11. The oncoming vehicle detection system of claim 5, wherein the calculated oncome direction is a tangent to the curved portion of the road at a location of the curved portion of the road corresponding to the oncoming vehicle.

12. An oncoming vehicle detection system comprising:
   means for determining that an oncoming vehicle and an ego vehicle are concurrently present on a curved portion of a road; and means for determining, in response thereto:
- a calculated oncome direction of the oncoming vehicle relative to the curved portion of the road;
- a measured oncome direction of the oncoming vehicle based on at least one measurement of the oncoming vehicle by a vehicle environment sensor of the oncoming vehicle detection system; and
- whether a difference between the calculated oncome direction and the measured oncome direction is indicative of the oncoming vehicle being crossing traffic.

* * * * *